United States Patent
Yano

(10) Patent No.: US 12,019,924 B2
(45) Date of Patent: Jun. 25, 2024

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Shodai Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,649

(22) Filed: Nov. 23, 2022

(65) Prior Publication Data
US 2023/0168847 A1 Jun. 1, 2023

(30) Foreign Application Priority Data
Dec. 1, 2021 (JP) .................. 2021-195537

(51) Int. Cl.
*G06F 3/12* (2006.01)
(52) U.S. Cl.
CPC .......... *G06F 3/1208* (2013.01); *G06F 3/1205* (2013.01); *G06F 3/1258* (2013.01)
(58) Field of Classification Search
CPC ..... G06F 3/1208; G06F 3/1205; G06F 3/1258
See application file for complete search history.

(56) References Cited

U.S. PATENT DOCUMENTS

| | | | | |
|---|---|---|---|---|
| 10,761,783 | B2 * | 9/2020 | Morishita | G06F 3/121 |
| 11,652,935 | B2 * | 5/2023 | Ogino | H04N 1/00517 |
| | | | | 358/1.13 |
| 11,831,825 | B2 * | 11/2023 | Hayakawa | H04N 1/00496 |
| 2007/0242999 | A1 * | 10/2007 | Tao | G03G 15/6544 |
| | | | | 400/188 |
| 2011/0032559 | A1 * | 2/2011 | Yanagawa | H04N 1/00846 |
| | | | | 358/1.13 |
| 2011/0228323 | A1 * | 9/2011 | Oshima | G06F 3/1253 |
| | | | | 358/1.15 |
| 2014/0367907 | A1 * | 12/2014 | Mori | G03G 15/6541 |
| | | | | 270/1.01 |
| 2019/0361600 | A1 * | 11/2019 | Matsuda | G06F 1/3215 |
| 2020/0177747 | A1 * | 6/2020 | Yasuda | H04N 1/00403 |
| 2020/0341708 | A1 * | 10/2020 | Kaneda | G06F 3/1205 |
| 2020/0412884 | A1 * | 12/2020 | Kubota | G06T 3/60 |
| 2023/0086808 | A1 * | 3/2023 | Morita | G06F 3/1287 |
| | | | | 358/1.15 |
| 2023/0111708 | A1 * | 4/2023 | Ito | G06F 3/1256 |
| | | | | 358/1.15 |

FOREIGN PATENT DOCUMENTS

JP 2020065107 A 4/2020

* cited by examiner

*Primary Examiner* — Helen Zong
(74) *Attorney, Agent, or Firm* — Canon U.S.A., Inc. IP Division

(57) ABSTRACT

An information processing apparatus configured to send a job to an image forming apparatus to execute a function of the image forming apparatus, the information processing apparatus including a reception unit configured to receive the job, and a display control unit configured to display, in a case where setting information relating to the job received by the reception unit includes a setting that causes an output to be different in accordance with a configuration of the image forming apparatus, a screen prompting a user to check an output content on a display unit.

14 Claims, 9 Drawing Sheets

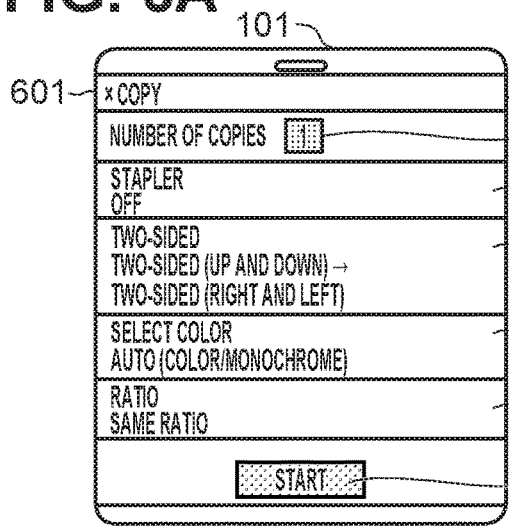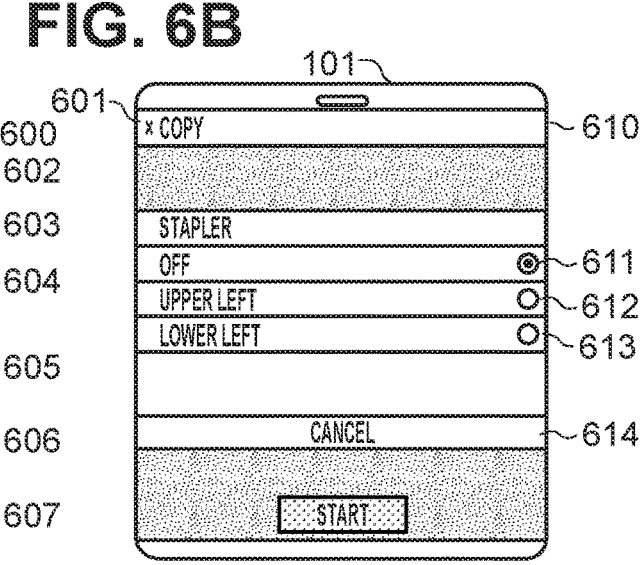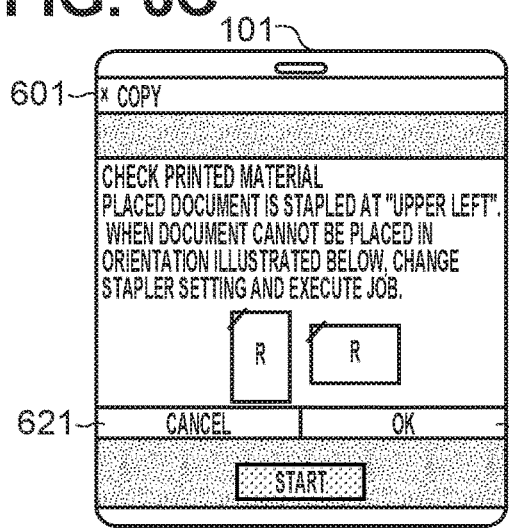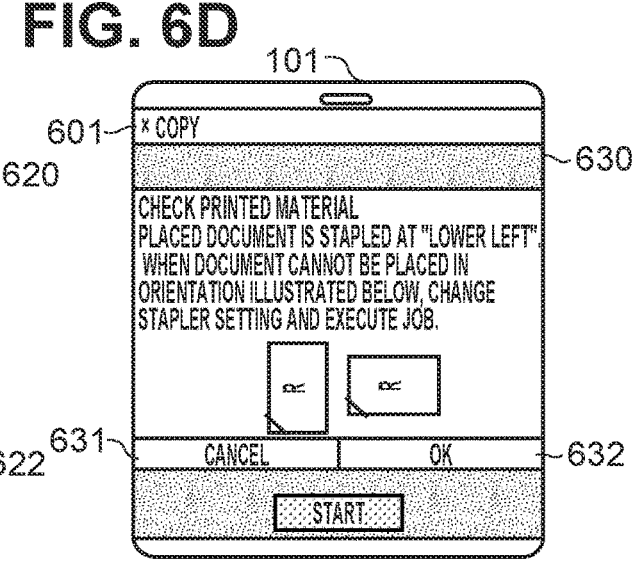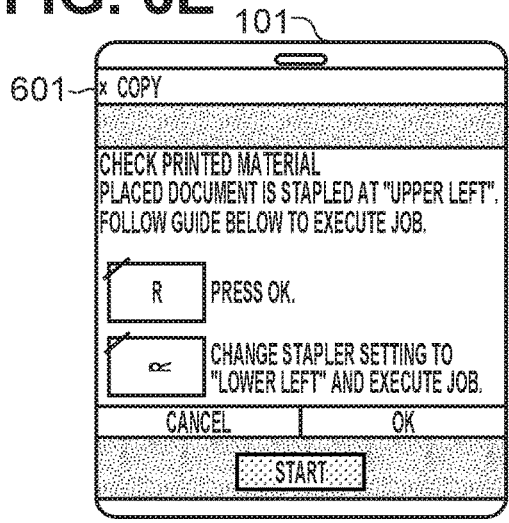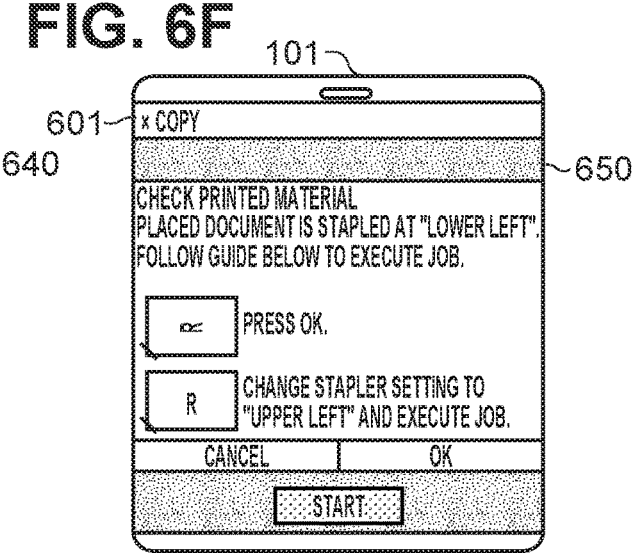

INFORMATION PROCESSING APPARATUS, CONTROL METHOD FOR INFORMATION PROCESSING APPARATUS, AND STORAGE MEDIUM

BACKGROUND

Field of the Disclosure

The present disclosure relates to an information processing apparatus, a control method for the information processing apparatus, and a storage medium.

Description of the Related Art

In recent years, along with the spread of high-performance mobile terminals called smartphones, there have been an increasing number of image forming apparatuses that operate in cooperation with the mobile terminals. For example, by using an application for cooperation with an image forming apparatus, a mobile terminal wirelessly sends an execution instruction for a job, such as scanning or printing, to the image forming apparatus, to cause the image forming apparatus to execute scanning or the like, based on the job to which various types of setting information is added.

As described above, a job to which setting information is added can be sent from a mobile terminal to an image forming apparatus, but even when an identical setting information is used, outputs from image forming apparatuses as sending destinations may be different from each other due to configuration differences among the image forming apparatuses. Consequently, a user is unaware of configuration differences between image forming apparatuses and executes a job from a mobile terminal without changing the setting, which may result in obtaining an output that is not intended by the user.

Japanese Patent Application Laid-Open No. 2020-65107 discusses a technique for displaying information on a setting value, which may cause a trouble, previously determined by an image forming apparatus, on a mobile terminal to prompt the user to change the setting.

However, according to the technique discussed in Japanese Patent Application Laid-Open No. 2020-65107, an operation to change the setting value to be a cause of trouble needs to be performed on the mobile terminal, and checking of whether the new setting value has been applied needs to be performed on the image forming apparatus. Thus, since the apparatus on which an operation for the setting is performed is different from the apparatus on which the setting is checked, which results in an issue of a reduction in the operability of user.

SUMMARY

In view of the above-described issue, embodiments of the present disclosure are directed to a technique, in a case of sending a job to an image forming apparatus to obtain an output, for more reliably obtaining the output intended by a user without reducing user operability.

Embodiments of the present disclosure include an information processing apparatus configured to send a job to an image forming apparatus to execute a function of the image forming apparatus, the information processing apparatus including a reception unit configured to receive the job, and a display control unit configured to display, in a case where setting information relating to the job received by the reception unit includes a setting that causes an output to be different in accordance with a configuration of the image forming apparatus, a screen prompting a user to check an output content on a display unit.

Further features of the present disclosure will become apparent from the following description of exemplary embodiments with reference to the attached drawings.

BRIEF DESCRIPTION OF THE DRAWINGS

FIGS. 6A to 6F are diagrams each illustrating an example of a screen displayed by the information processing apparatus according to exemplary embodiments.

DESCRIPTION OF THE EMBODIMENTS

A first exemplary embodiment will be described. Best modes for carrying out embodiments of the present disclosure will be described below with reference to the drawings. The exemplary embodiments below are not intended to limit the present disclosure, and not all of the combinations of characteristics described in the exemplary embodiments are essential to the solution of the present disclosure.

Figure 1:
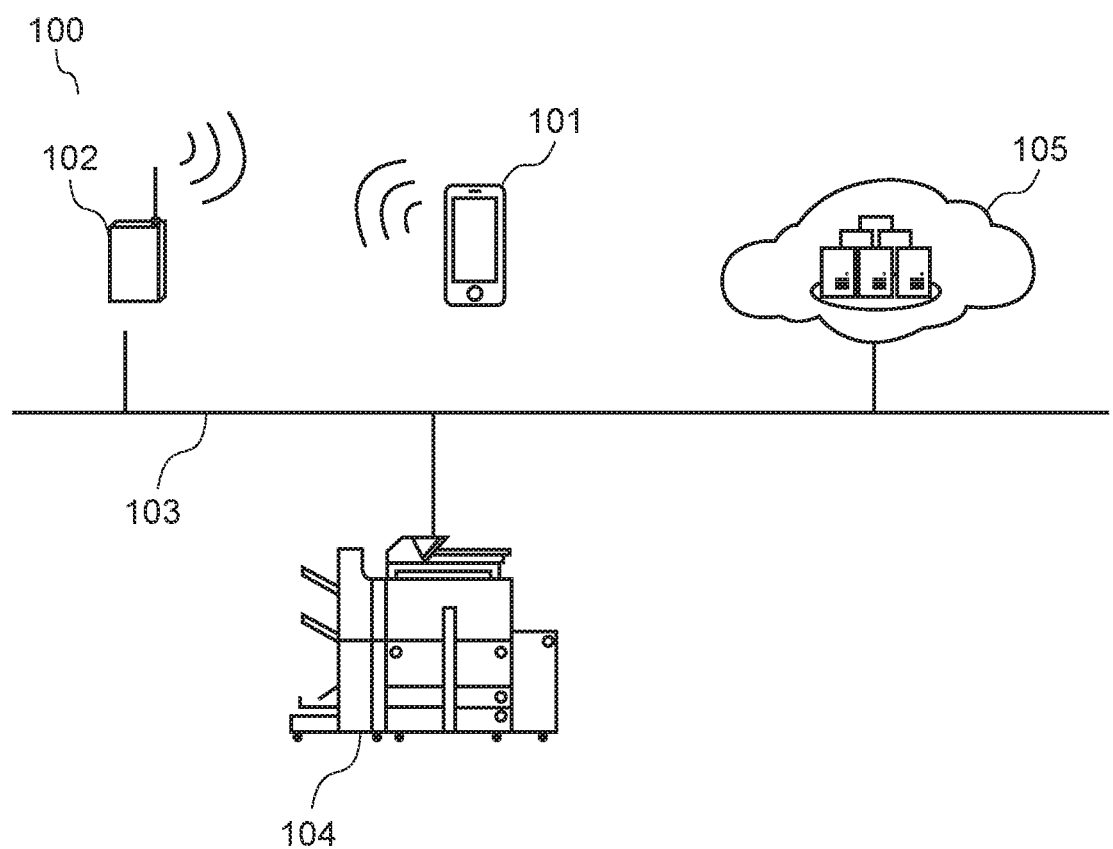
FIG. 1 is a diagram illustrating a configuration example of an information processing system.

First, a configuration example of an information processing system according to an exemplary embodiment will be described with reference to FIG. 1.

An information processing system 100 includes an information processing apparatus 101, a wireless local area network (LAN) terminal 102, an image forming apparatus 104, and a cloud server 105, each of which is connected via a network 103.

The information processing apparatus 101 is a mobile terminal, such as a smartphone, on which an operating system for a small terminal or programs for controlling calls and data communications can operate. Alternatively, the information processing apparatus 101 can be a personal computer without audio control, position detection control, cell-phone data communications, or the like. The information processing apparatus 101 is connected to the network 103 via the wireless LAN terminal 102.

The wireless LAN terminal 102 is a wireless LAN base unit having general network and router functions to provide a wireless LAN through Wi-Fi in, for example, homes and offices.

The image forming apparatus 104 is a digital multifunction peripheral (MFP) having various job execution functions, such as a print function, a copy function, a scan function, and a fax receiving and sending function. The user operates the information processing apparatus 101 to issue job execution instructions to the image forming apparatus 104, to cause the image forming apparatus 104 to execute various functions.

The cloud server 105 performs processing to, for example, manage data to be used by the information processing apparatus 101 and the image forming apparatus 104 and expand various functions, via the network 103. According to the present exemplary embodiment, the image forming apparatus 104 and the cloud server 105 are connected to the network 103 via a wired connection, but may be connected wirelessly by using the wireless LAN terminal 102 as with the information processing apparatus 101.

The information processing apparatus 101 and the image forming apparatus 104 are able to perform short-range wireless communications via wireless signals of Near Field Communication (NFC), Bluetooth® Low Energy (Bluetooth® LE), etc. The image forming apparatus 104 has an NFC communication unit and a Bluetooth® LE communication unit, described below, each of which includes information (IP address, MAC address, etc.) for wireless LAN connection with image forming apparatus 104, and the information processing apparatus 101 acquires the connection information via a short-range wireless communication. Then, based on the acquired connection information, the information processing apparatus 101 and the image forming apparatus 104 start communication.

Figure 2:
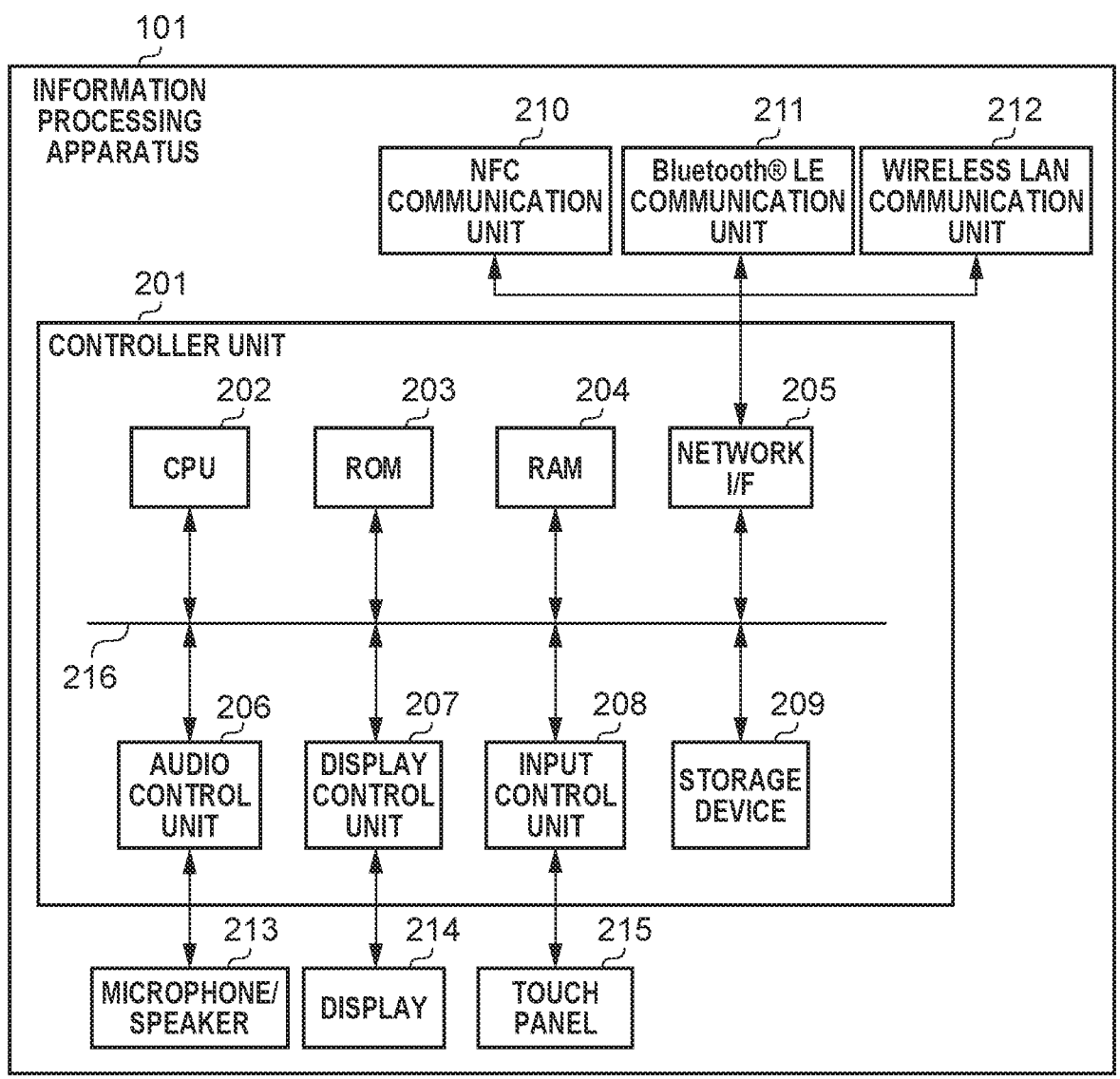
FIG. 2 is a block diagram illustrating an example of a hardware configuration of an information processing apparatus.

Next, an example of a hardware configuration of the information processing apparatus 101 according to the exemplary embodiment will be described with reference to FIG. 2.

The information processing apparatus 101 includes a controller unit 201. The controller unit 201 controls various communication units, such as an NFC communication unit 210, a Bluetooth® LE communication unit 211, and a wireless LAN communication unit 212, and various user interface (UI) units, such as a microphone/speaker 213, a display 214, and a touch panel 215.

The controller unit 201 includes a central processing unit (CPU) 202, a read only memory (ROM) 203, a random access memory (RAM) 204, a network interface (I/F) 205, an audio control unit 206, a display control unit 207, an input control unit 208, and a storage device 209, each of which is connected via a system bus 216.

The CPU 202 controls the overall system of the information processing apparatus 101.

The ROM 203 stores the operating system of the information processing apparatus 101 and applications that control calls and data communications, and the CPU 202 executes various programs.

The RAM 204 is a memory for the CPU 202 to execute various programs and is a work memory area where applications execute programs.

The storage device 209 is a nonvolatile storage apparatus that stores various operation mode settings, operation logs, and the like, which need to be retained even after the information processing apparatus 101 is reactivated.

The network I/F 205 is connected to the NFC communication unit 210, the Bluetooth® LE communication unit 211, and the wireless LAN communication unit 212, to control various wireless communications with the image forming apparatus 104 and the cloud server 105.

The audio control unit 206 controls input/output of audio data via the microphone/speaker 213.

The display control unit 207 controls output of image data to be displayed on the display 214.

The input control unit 208 controls input of information received from the user via buttons and the touch panel 215. Various applications that are executed by the information processing apparatus 101 are provided to the user via the audio control unit 206, the display control unit 207, and the input control unit 208.

Figure 3:
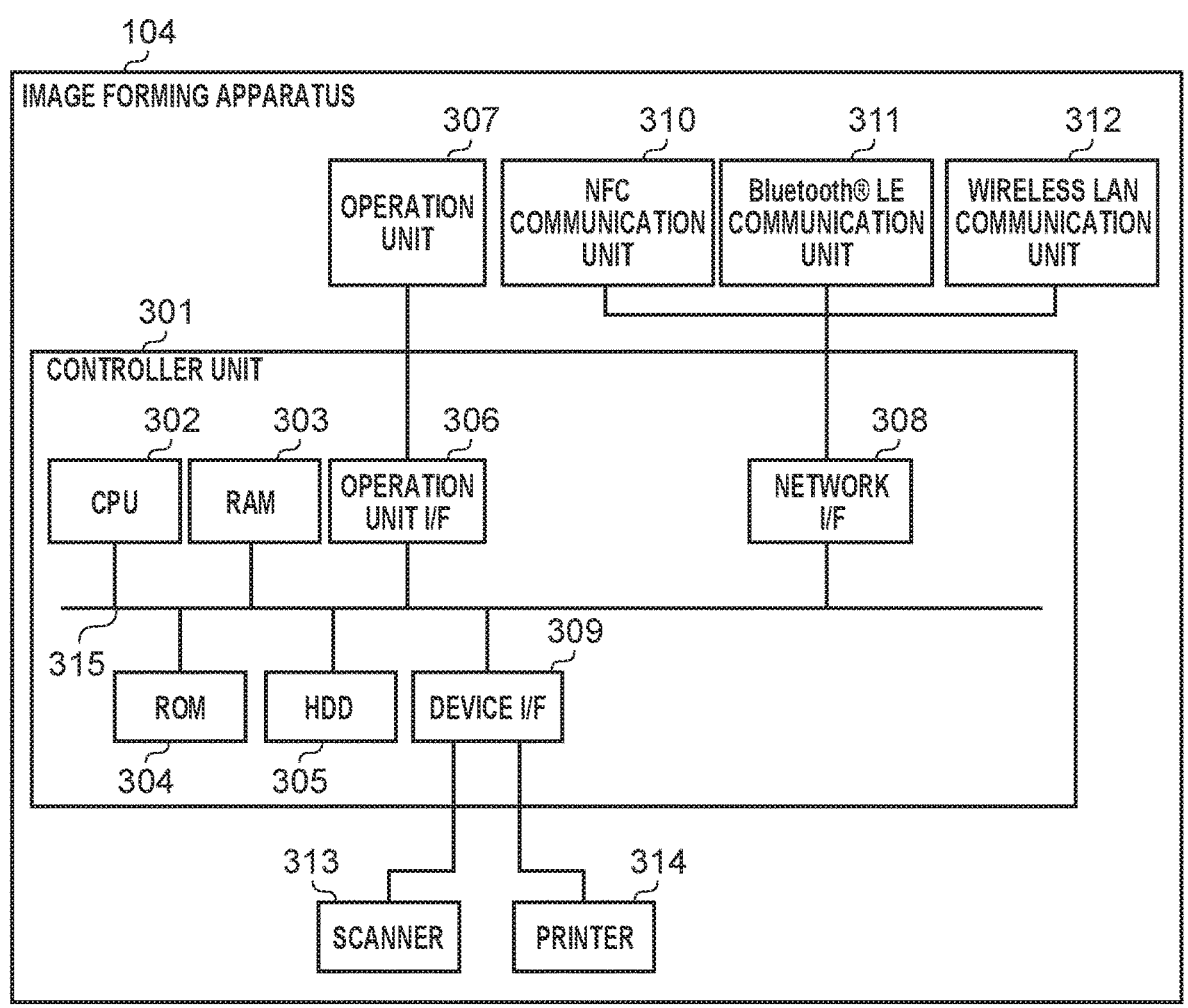
FIG. 3 is a block diagram illustrating an example of a hardware configuration of an image forming apparatus.

Next, an example of a hardware configuration of the image forming apparatus 104 according to the exemplary embodiment will be described with reference to FIG. 3.

The image forming apparatus 104 includes a controller unit 301. The controller unit 301 controls various communication units, such as an NFC communication unit 310, a Bluetooth® LE communication unit 311, and a wireless LAN communication unit 312, an operation unit 307, a scanner 313, and a printer 314.

When the user uses the copy function, the controller unit 301 controls the scanner 313 to acquire image data on a document and controls the printer 314 to print and output an image on paper. When the user uses the scan function, the controller unit 301 controls the scanner 313 to acquire image data on a document, convert the image data into code data, and send the code data to the information processing apparatus 101, the cloud server 105, or the like, via the network 103.

When the user uses the print function, the controller unit 301 receives print data (code data) from the information processing apparatus 101, the cloud server 105, or the like, via the network 103. Then, the controller unit 301 converts the received print data into image data and sends the image data to the printer 314. The printer 314 prints and outputs an image on paper, based on the received image data. The image forming apparatus 104 also has the fax receiving function to receive data from ISDN, or the like, and print out the received data, and the fax sending function to send scanned data to ISDN, or the like. An execution instruction for processing in each of the above-described functions is called a job, and the image forming apparatus 104 executes predetermined processing in accordance with a job corresponding to each of the functions.

The controller unit 301 includes a CPU 302, a RAM 303, a ROM 304, a hard disk drive (HDD) 305, an operation unit I/F 306, a network I/F 308, and a device I/F 309, each of which is connected via a system bus 315.

The CPU 302 controls the overall system of the image forming apparatus 104.

The RAM 303 is a system work memory for the CPU 302 to operate and is an image memory that temporarily stores image data. The RAM 303 also contains programs, such as the operating system, system software, and application software, and data. The RAM 303 stores scanned image data read by the scanner 313 and print image data received from the information processing apparatus 101 via the network 103.

The ROM 304 stores a system boot program.

The HDD 305 stores the operating system, system software, application software, image data, setting data, and the like.

The operation unit I/F 306 is an interface unit for the operation unit 307 and outputs information to be displayed on the operation unit 307 to the operation unit 307. The operation unit I/F 306 receives information input by the user from the operation unit 307.

The network I/F 308 is connected to the NFC communication unit 310, the Bluetooth® LE communication unit 311, and the wireless LAN communication unit 312 to control various wireless communications with the information processing apparatus 101 and the cloud server 105. The wireless LAN communication unit 312 forms a wireless LAN with the information processing apparatus 101 via the network 103. The NFC communication unit 310 and the Bluetooth® LE communication unit 311 perform short-range wireless communications with the information processing apparatus 101 by using wireless signals. The image forming apparatus 104 sends and receives job setting information, image data, and the like, to and from the information processing apparatus 101 via the network I/F 308 and executes jobs in response to received execution commands for various functions of the image forming apparatus 104.

Here, the job setting information is detailed setting information for execution of the functions of the image forming apparatus 104, and for example, the job setting information for the copy function is information on setting values of the ratio, color, and the like.

The device I/F 309 connects the controller unit 301 to the scanner 313 and the printer 314 for image data reading and printing, to perform input/output processing of image data.

Here, depending on types of the image forming apparatus 104, configurations of the scanner 313 and the printer 314 are different among the image forming apparatuses 104, and image data that can be input and output is different in accordance with the configuration differences. For example, in a case of an image forming apparatus including a scanner on which documents can be placed only in a landscape orientation, the image forming apparatus can recognize only landscape-oriented documents as input. On the other hand, in a case of an image forming apparatus including a scanner supporting both landscape-oriented documents and portrait-oriented documents, the image forming apparatus can recognize landscape-oriented documents and portrait-oriented documents as input. In the present exemplary embodiment, the job setting information described above also includes information on a setting value, such as a stapler setting value, which causes a difference in output results in accordance with the configuration differences among the image forming apparatuses 104.

Figure 4:
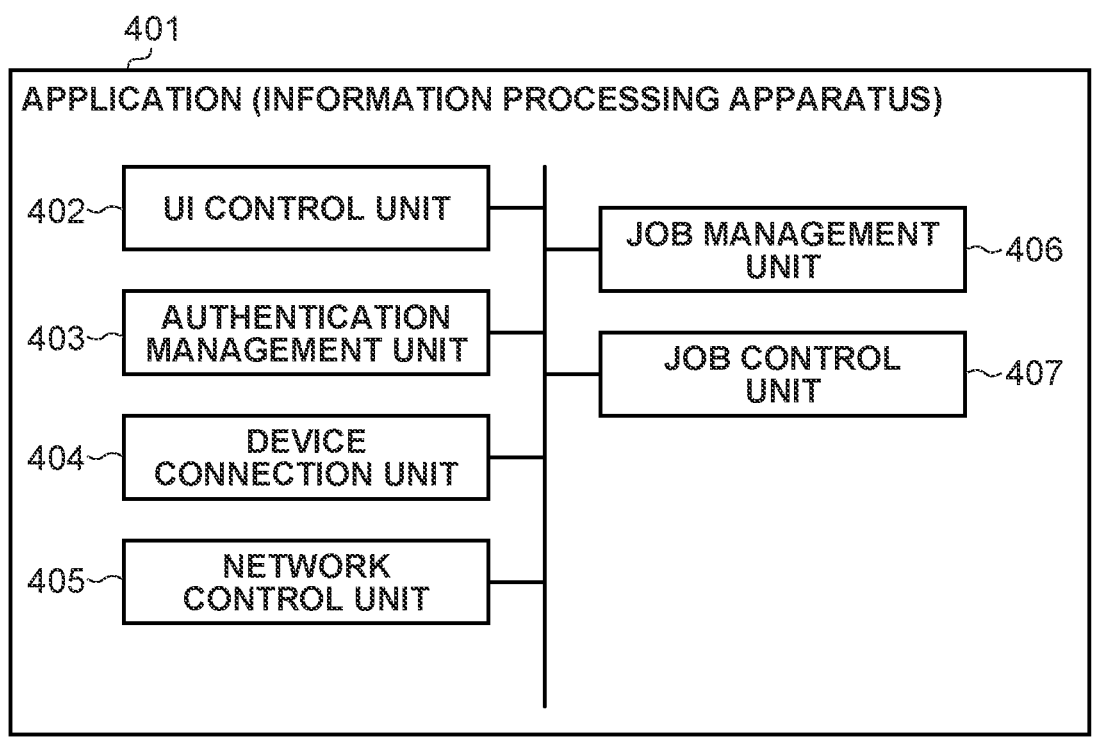
FIG. 4 is a block diagram illustrating an example of a functional configuration of the information processing apparatus.

Next, an example of the functional configuration of the information processing apparatus 101 according to the exemplary embodiment will be described with reference to FIG. 4.

An application 401 is software that is executed by the CPU 202 of the information processing apparatus 101 and is stored in the RAM 204. The application 401 includes a UI control unit 402, an authentication management unit 403, a device connection unit 404, a network control unit 405, a job management unit 406, and a job control unit 407.

The UI control unit 402 receives the job setting information input by the user using the touch panel 215 and sends the job setting information to the job management unit 406 via the input control unit 208. The UI control unit 402 receives a response from the job management unit 406 and the job control unit 407 and outputs information to the display 214 via the display control unit 207. The details about screens displayed on the display 214 by the UI control unit 402 will be described below with reference to FIGS. 6A to 6F. The UI control unit 402 receives user authentication information input by the user using the touch panel 215 and sends the received user authentication information to the authentication management unit 403 via the input control unit 208.

The authentication management unit 403 sends the user authentication information received from the UI control unit 402 to the network control unit 405. The user authentication information is used for user authentication processing in the image forming apparatus 104.

The device connection unit 404 establishes short-range wireless communications by NFC or Bluetooth® LE between the information processing apparatus 101 and the image forming apparatus 104 and wireless LAN communications via the network 103. For example, in the case of NFC, the user brings the NFC communication unit 210 of the information processing apparatus 101 and the NFC communication unit 310 of the image forming apparatus 104 close to each other to start a short-range wireless communication. In the case of Bluetooth® LE, the user brings the Bluetooth® LE communication unit 211 of the information processing apparatus 101 and the Bluetooth® LE communication unit 311 of the image forming apparatus 104 close to each other. In a case where the device connection unit 404 determines that the Bluetooth® LE communication unit 211 and the Bluetooth® LE communication unit 311 are within a range where a signal strength of the Bluetooth® LE beacon is equal to or more than a certain strength, the device connection unit 404 starts a short-range wireless communication.

As described above, when the user brings the NFC or Bluetooth® LE communication units of the information processing apparatus 101 and the image forming apparatus 104 close to each other, the device connection unit 404 acquires the connection information for the wireless LAN communication from the image forming apparatus 104. Then, the information processing apparatus 101 uses the acquired connection information to start the wireless LAN connection with the image forming apparatus 104 via the network 103.

The network control unit 405 sends the job setting information, job execution instruction commands, image data, user authentication information, and the like, to the image forming apparatus 104 via the network 103. The network control unit 405 receives the job setting information stored in the image forming apparatus 104 via the network 103.

The job management unit 406 stores, in the RAM 204 and the storage device 209, the job setting information input by the user via the UI control unit 402 and the job setting information received from the image forming apparatus 104 and the cloud server 105 via the network control unit 405. In this processing, the job management unit 406 manages the job setting information as "favorite" that is the setting frequently used by the user. The job management unit 406 manages, as "preset", the job setting information that has been stored in the RAM 204 or the storage device 209 when the application 401 has been installed.

The job control unit 407 generates information on a job execution instruction, based on "favorite" and "preset" registered by the job management unit 406, and sends the job execution instruction to the image forming apparatus 104 via the network 103. In this processing, the job control unit 407 checks the setting values of the job setting information. The job control unit 407 acquires information on a job execution state and an operating state of devices, such as the scanner 313 and printer 314, and the like, from the image forming apparatus 104 via the network 103 and sends the information to the UI control unit 402.

Figure 5:
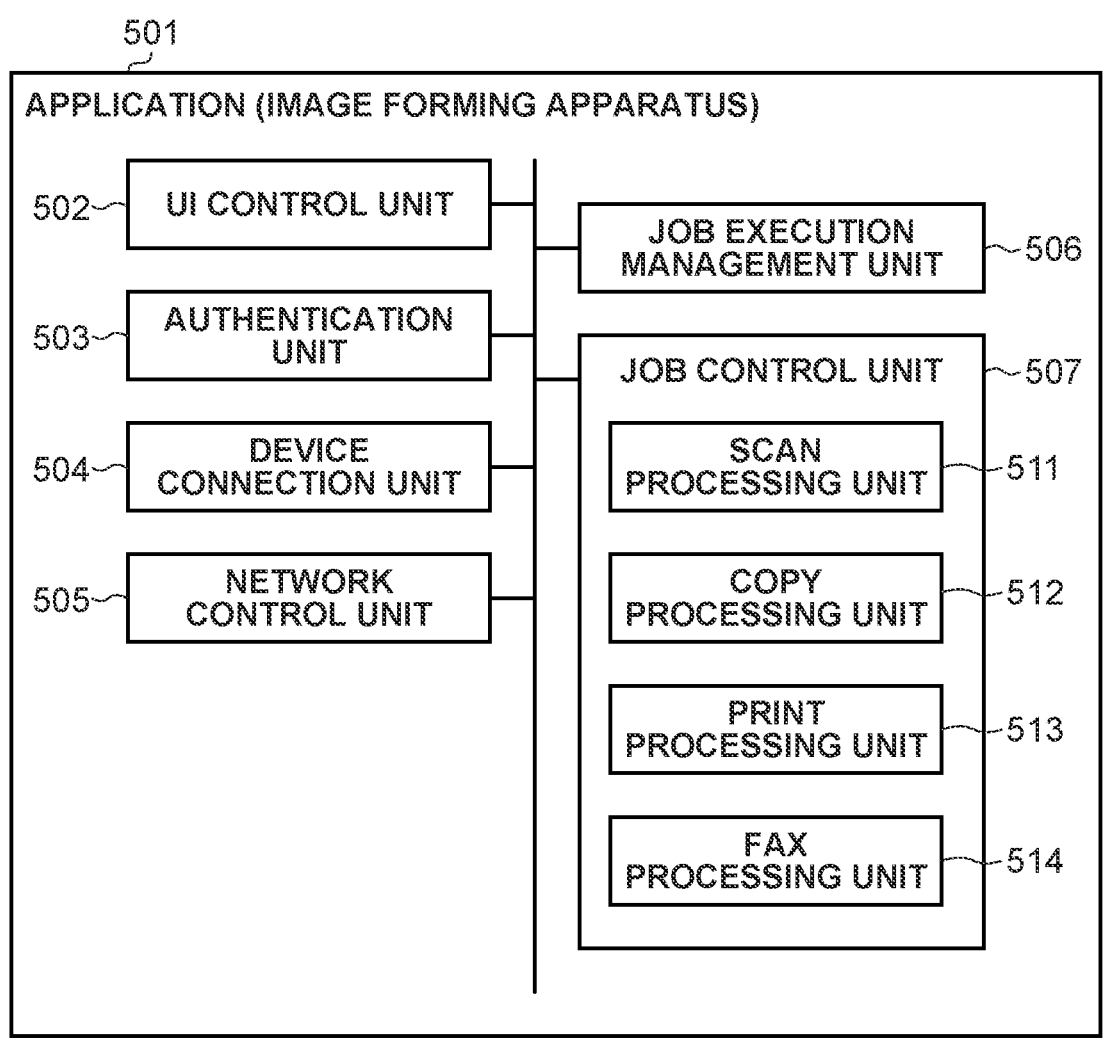
FIG. 5 is a block diagram illustrating an example of a functional configuration of the image forming apparatus.

Next, an example of the functional configuration of the image forming apparatus 104 according to the exemplary embodiment will be described with reference to FIG. 5.

An application 501 is software that is executed by the CPU 302 of the image forming apparatus 104 and is stored in the RAM 303. The application 501 includes a UI control unit 502, an authentication unit 503, a device connection unit 504, a network control unit 505, a job execution management unit 506, and a job control unit 507.

The UI control unit 502 receives the job setting information input by the user using the operation unit 307 via the operation unit I/F 306 and sends the job setting information to the job execution management unit 506. The UI control unit 502 receives a response from the job execution management unit 506 or the job control unit 507 and outputs the response to the operation unit 307 via the operation unit I/F 306.

The authentication unit 503 performs user authentication processing based on the user authentication information received from the information processing apparatus 101 and returns the result.

The device connection unit 504 performs a short-range wireless communication between the information processing apparatus 101 and the image forming apparatus 104 and establishes wireless LAN communication via the network 103.

The network control unit 505 receives the job setting information, job execution instruction commands, image data, user authentication information, and the like, from the information processing apparatus 101 via the network 103.

The network control unit 505 sends the job setting information stored in the image forming apparatus 104 to the information processing apparatus 101 via the network 103.

The job execution management unit 506 stores, in the RAM 204 and the HDD 305, the job setting information input by the user via the UI control unit 502 and the job setting information received from the information processing apparatus 101 or the cloud server 105 via the network control unit 505. In this processing, the job execution management unit 506 manages the job setting information as "favorite" that is the setting frequently used by the user. The job execution management unit 506 manages, as "preset", the job setting information that has been stored in the RAM 204 or the storage device 209 when the application 501 has been installed. The job execution management unit 506 manages the job setting information on jobs executed by the image forming apparatus 104 as "history".

The job control unit 507 controls each processing unit, such as a scan processing unit 511, a copy processing unit 512, a print processing unit 513, and a fax processing unit 514 and execute various jobs according to the received job setting information. In this processing, the job control unit 507 executes various jobs based on the job setting information set by the user using the operation unit 307 and the job setting information about "favorite" and "preset" registered by the job execution management unit 506.

The job control unit 507 receives the job execution instruction from the information processing apparatus 101 via the network 103 and executes various jobs in accordance with the job setting information on the received job. The job control unit 507 sends information on a job execution state and an operating state of devices, such as the scanner 313 and the printer 314, and the like, to the information processing apparatus 101 via the network 103.

Next, with reference to FIGS. 6A to 6F, screen examples on which the user input the job setting information in the information processing apparatus 101 will be described. In the following description, a stapler setting is described as an example of the setting that causes a difference in outputs in accordance with the configuration differences among the image forming apparatuses 104.

A copy screen 600 in FIG. 6A is a screen on which the settings to perform copying by the image forming apparatus 104 is set and is a screen displayed on the display 214 by the UI control unit 402. A title 601 displays the title of the screen and a button to cancel the settings and return to a previous screen. A number-of-copies selection area 602 displays the number of copies, and when the number-of-copies selection area 602 is pressed, a transition is made to a number-of-copies setting screen (not illustrated) for changing of the number of copies.

A lower section of a stapler setting area 603 displays the current stapler setting, and when the stapler setting area 603 is pressed, a transition is made to a stapler setting dialog 610 described below.

As in the stapler setting area 603, lower sections of a two-sided setting area 604, a color selection area 605, and a ratio setting area 606 display the current setting values and, when one of the areas is pressed, a transition is made to a screen for changing of a setting value corresponding to the pressed area. When a start button 607 is pressed, the job setting information and an execution instruction for copying are sent to the image forming apparatus 104, and the job is executed by the image forming apparatus 104. In this processing, in a case where the stapler setting value is other than "off", a printed material check dialog described below is displayed before the information is sent to the image forming apparatus 104.

The stapler setting dialog 610 in FIG. 6B is a screen for the stapler setting and includes a stapler setting "off" button 611, a stapler setting "upper left" button 612, a stapler setting "lower left" button 613, and a cancel button 614.

When any of the stapler setting "off" button 611, the stapler setting "upper left" button 612, and the stapler setting "lower left" button 613 is pressed, the current stapler setting value is changed to a setting value corresponding to the pressed button. Then, the stapler setting dialog 610 transitions to the copy screen 600 in FIG. 6A, and the lower section of the stapler setting area 603 displays the setting value corresponding to the pressed button. In a case where the cancel button 614 is pressed, a transition is made to the copy screen 600 without changing the current stapler setting value.

A printed material check dialog (for stapler "upper left" setting) 620 in FIG. 6C is a check screen displayed in a case where the stapler setting value is "upper left". The printed material check dialog 620 displays, for example, a diagram illustrating an example of the output to be obtained when the job is executed with the current setting value and a text prompting the user to check the setting value.

In a case where a cancel button 621 is pressed, the copy execution instruction is canceled. In a case where an OK button 622 is pressed, the copy job setting information and the execution instruction are sent to the image forming apparatus 104 and the job is executed by the image forming apparatus 104. In the following descriptions about dialogues, operations when the OK button and the cancel button are pressed are similar to the operations described above, and thus the redundant description is omitted.

A printed material check dialog (for stapler "lower left" setting) 630 in FIG. 6D is a screen displayed in a case where the stapler setting value is "lower left".

A printed material check dialog (for stapler "upper left" setting, with landscape-oriented documents) 640 in FIG. 6E is a screen displayed in a case where the image forming apparatus 104 supports only landscape-oriented documents and the stapler setting value is "upper left".

A printed material check dialog (for stapler "lower left" setting, with landscape-oriented documents) 650 in FIG. 6F is a screen displayed in a case where the image forming apparatus 104 supports only landscape-oriented documents, and the stapler setting value is "lower left".

Figure 7:
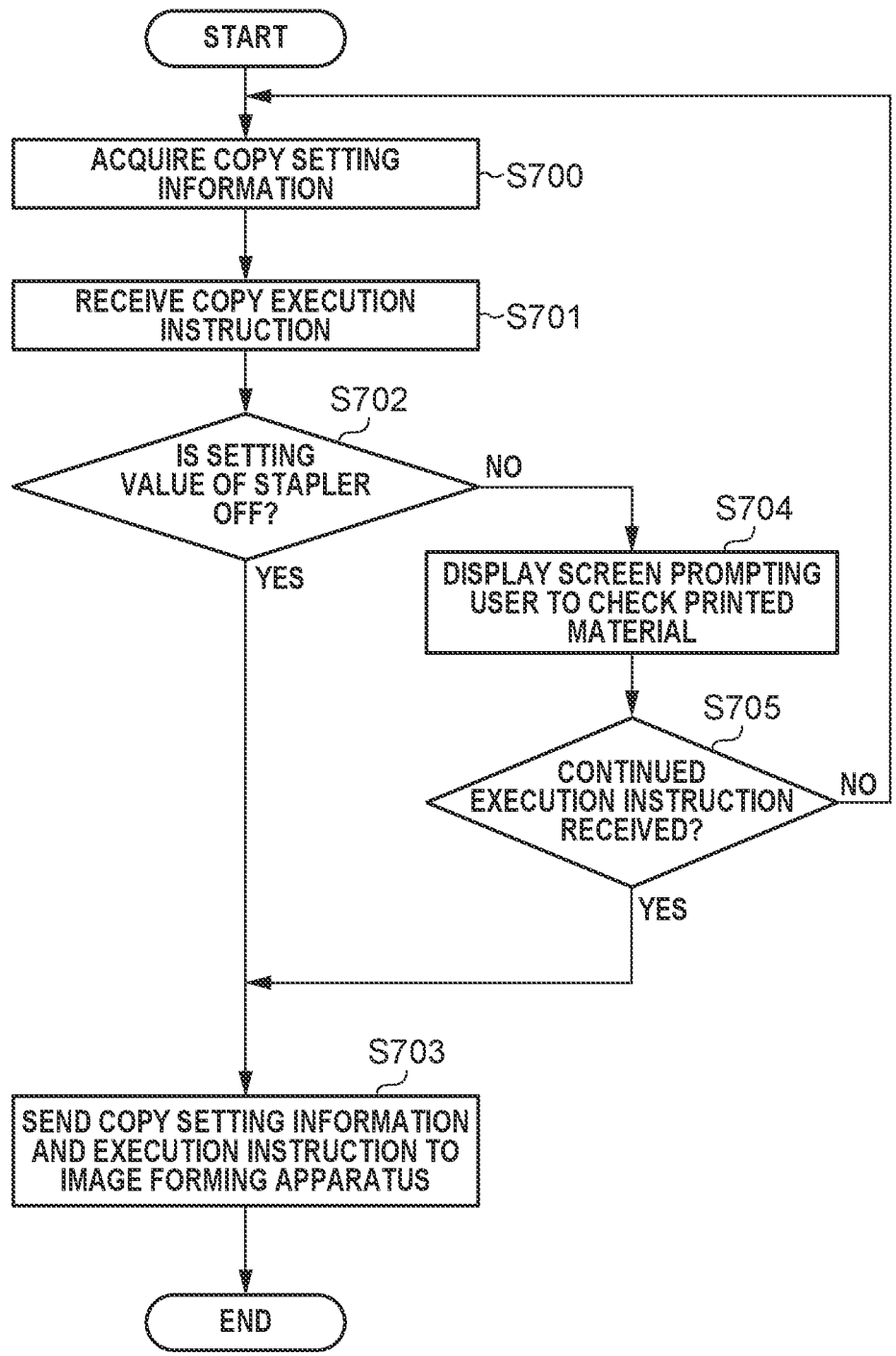
FIG. 7 is a flowchart illustrating an example of a processing procedure of the information processing apparatus according to a first exemplary embodiment.

Next, with reference to the flowchart in FIG. 7, a description is given of the processing for display of the printed material check dialog in a case where the stapler setting has been made when the copy execution instruction is received from the user in the information processing apparatus 101. The processing of the flowchart starts when the copy screen 600 of FIG. 6A is displayed on the display 214 by a user operation.

In step S700, the UI control unit 402 acquires the setting values in the number-of-copies selection area 602, the stapler setting area 603, the two-sided setting area 604, the color selection area 605, and the ratio setting area 606 on the copy screen 600.

Subsequently, in step S701, the user presses the start button 607 on the copy screen 600, and thus the UI control unit 402 receives a copy execution instruction.

In step S702, the job control unit 407 determines whether the stapler setting is off. In a case where the job control unit 407 determines that the stapler setting is off (YES in step S702), the processing proceeds to step S703. On the other hand, in a case where the job control unit 407 determines that the stapler setting is not off (NO in step S702), the processing proceeds to step S704.

In step S703, the job control unit 407 sends the copy setting information and the execution instruction to the image forming apparatus 104.

In step S704, the UI control unit 402 displays the screen prompting the user to check the printed material, in accordance with the current stapler setting value. Specifically, in a case where the stapler setting value is "upper left", the UI control unit 402 displays the printed material check dialog (for stapler "upper left" setting) 620 or the printed material check dialog (for stapler "upper left" setting, with landscape-oriented documents) 640 in step S704. In a case where the stapler setting value is "lower left", the printed material check dialog (for stapler "lower left" setting) 630 or the printed material check dialog (with stapler "lower left" setting, with landscape-oriented documents) 650 is displayed in step S704.

The above-described configuration causes the user to check the stapler position again, and in a case where the output to be obtained is not as intended, the user can correct the document orientation or the stapler setting value.

In step S705, the UI control unit 402 determines whether a continued execution instruction has been received. For example, in a case where the OK button 622 is pressed in the printed material check dialog (for stapler "upper left" setting) 620, the UI control unit 402 determines that the continued execution instruction has been received. On the other hand, for example, in a case where the cancel button 621 is pressed in the printed material check dialog (for stapler "upper left" setting) 620, the UI control unit 402 determines that the continued execution instruction has not been received.

In a case where the UI control unit 402 determines that the continued execution instruction has been received (YES in step S705), the processing proceeds to step S703. On the other hand, in a case where the UI control unit 402 determines that the continued execution instruction has not been received (NO in step S705), the processing returns to step S700, and the copy screen 600 is displayed.

According to the present exemplary embodiment, the screen prompting the user to check the output is displayed in a case where the execution instruction is received, but the screen prompting the user to check the output can be displayed in a case where the stapler setting value is edited. For example, the screen prompting the checking can be displayed in a case where the stapler setting area 603 is pressed by the user, or the screen prompting the checking can be displayed after the setting is received on the stapler setting dialog 610.

The stapler setting for the copy function described above is an example, and other copy settings and settings for the print function, the fax function, and the like, may be applied.

As described above, according to the present exemplary embodiment, in a case of the setting, such as the stapler setting, which causes a difference in outputs in accordance with functional differences among the image forming apparatuses, the checking of the output is prompted before the execution instruction is sent to the image forming apparatus, which can prevent the user to obtain an unintended output. Furthermore, the operation for changing of the setting value and the operation for checking of the applied setting value can be performed only on the information processing apparatus, which can improve the user operability.

In the method according to the first exemplary embodiment, in a case where the setting that causes a difference in outputs in accordance with the functional differences among the image forming apparatuses is set on the mobile terminal, the user is prompted to check the output before the execution instruction is sent to the image forming apparatus. However, in the method according to the first exemplary embodiment, if the user continuously performs copying by using the same setting, the screen prompting the user to check the output is displayed each time copying is executed, which results in the issue of a reduction in the user operability.

Thus, according to a second exemplary embodiment, in a case of continuous execution using the same setting, the screen prompting the user to check the output is displayed only at the time of the first execution. The method according to the second exemplary embodiment will be described with reference to the flowchart in FIG. 8. An information processing apparatus 101 and an image forming apparatus 104 according to the present exemplary embodiment have configurations similar to the configurations of the information processing apparatus 101 and the image forming apparatus 104 described in the first exemplary embodiment, and thus the redundant description is omitted.

Figure 8:
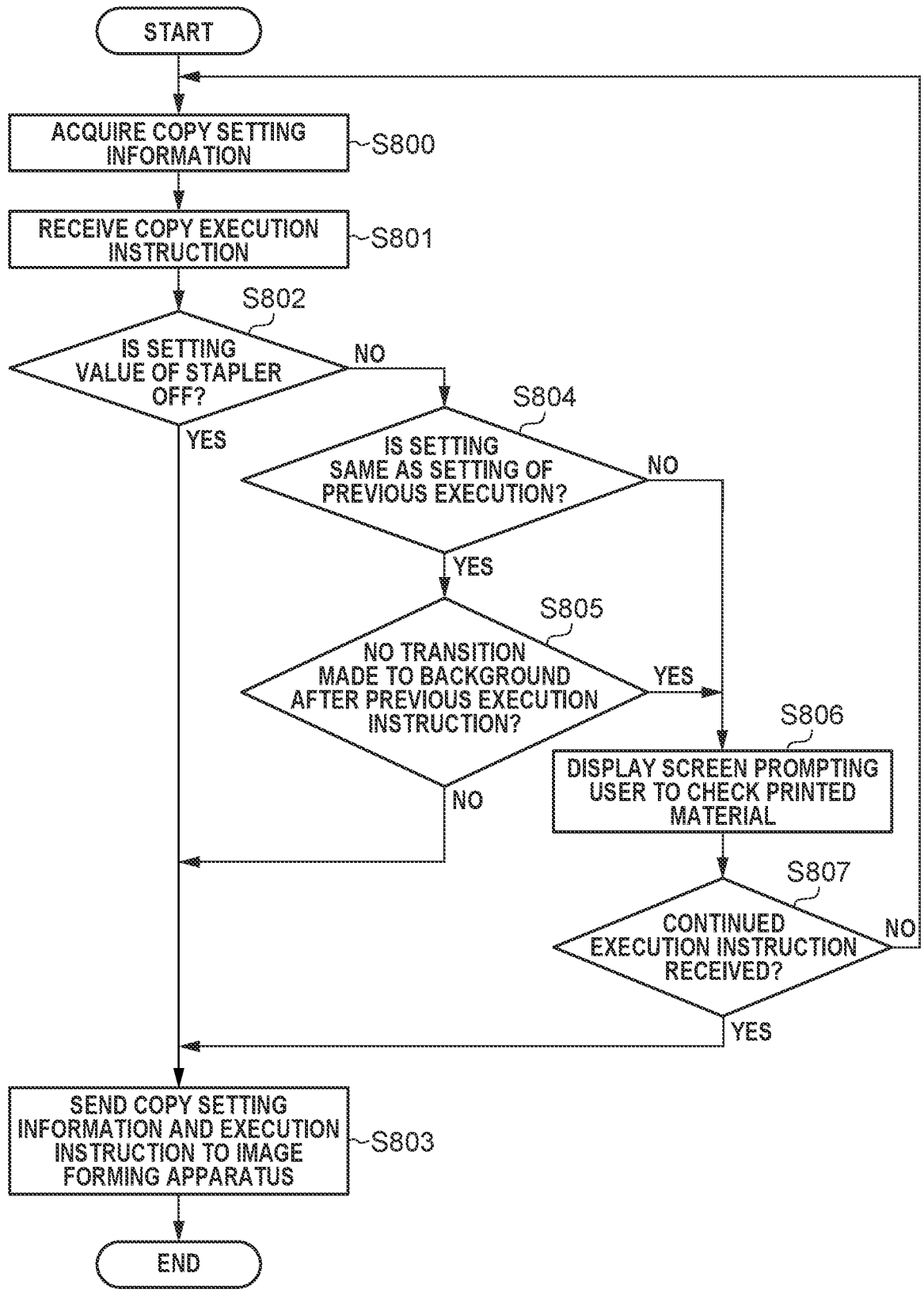
FIG. 8 is a flowchart illustrating an example of a processing procedure of the information processing apparatus according to a second exemplary embodiment.

FIG. 8 is a flowchart illustrating an example of a processing procedure in which, when copying is executed, the information processing apparatus 101 determines whether copying is executed continuously by using a previous setting and determines, based on a result of the determination, whether the printed material check dialog is to be displayed. The processing of the flowchart starts when the copy screen 600 of FIG. 6A is displayed on the display 214 by a user operation.

In steps S800 to S803, the UI control unit 402 and the job control unit 407 perform processing similar to the processing in steps S700 to S703 according to the first exemplary embodiment.

In step S804, the job control unit 407 determines whether the setting is same as a setting of a job for a previous copy execution. In a case where the job control unit 407 determines that the setting is same as the previous setting (YES in step S804), the processing proceeds to step S805. On the other hand, in a case where the job control unit 407 determines that the setting is not same as the previous setting (NO in step S804), the processing proceeds to step S806.

In step S805, the job control unit 407 determines whether no transition has been made to the background after the job for the previous copy execution has been sent. In a case where the job control unit 407 determines that no transition has been made to the background (NO in step S805), the processing proceeds to step S803. On the other hand, in a case where the job control unit 407 determines that a transition has been made to the background (YES in step S805), the processing proceeds to step S806. As described above, if a transition has been made to the background even once after the job for the previous function execution has been sent, the user may have forgotten about the previous setting value and thus prompting the user to check the output is performed.

In steps S806 and S807, the UI control unit 402 performs processing similar to the processing in steps S704 and S705 according to the first exemplary embodiment.

As described above, according to the present exemplary embodiment, in the case of continuous execution using the same setting, the screen for prompting the user to check the output is displayed only at the time of the first execution, whereby the user operability can be further improved. According to the present exemplary embodiment, in a case where the setting is same as the setting of the job for the previous copy execution and no transition has been made to the background, the display of the screen prompting the user to check the output is omitted, but the processing in step S805 can be omitted.

According to the first exemplary embodiment, since the check screen is displayed even when the execution instruction is issued to any image forming apparatus, the user needs to perform the checking while comparing model information on the image forming apparatus with the check screen. Thus, in a method according to the third exemplary embodiment, the check screen to be displayed is changed by using the model information on the image forming apparatus. The method according to the third exemplary embodiment will be described with reference to the flowchart in FIG. 9. The information processing apparatus 101 and the image forming apparatus 104 according to the present exemplary embodiment have t configurations similar to the configurations of the information processing apparatus 101 and the image forming apparatus 104 described according to the first exemplary embodiment, and thus the redundant description is omitted.

Figure 9:
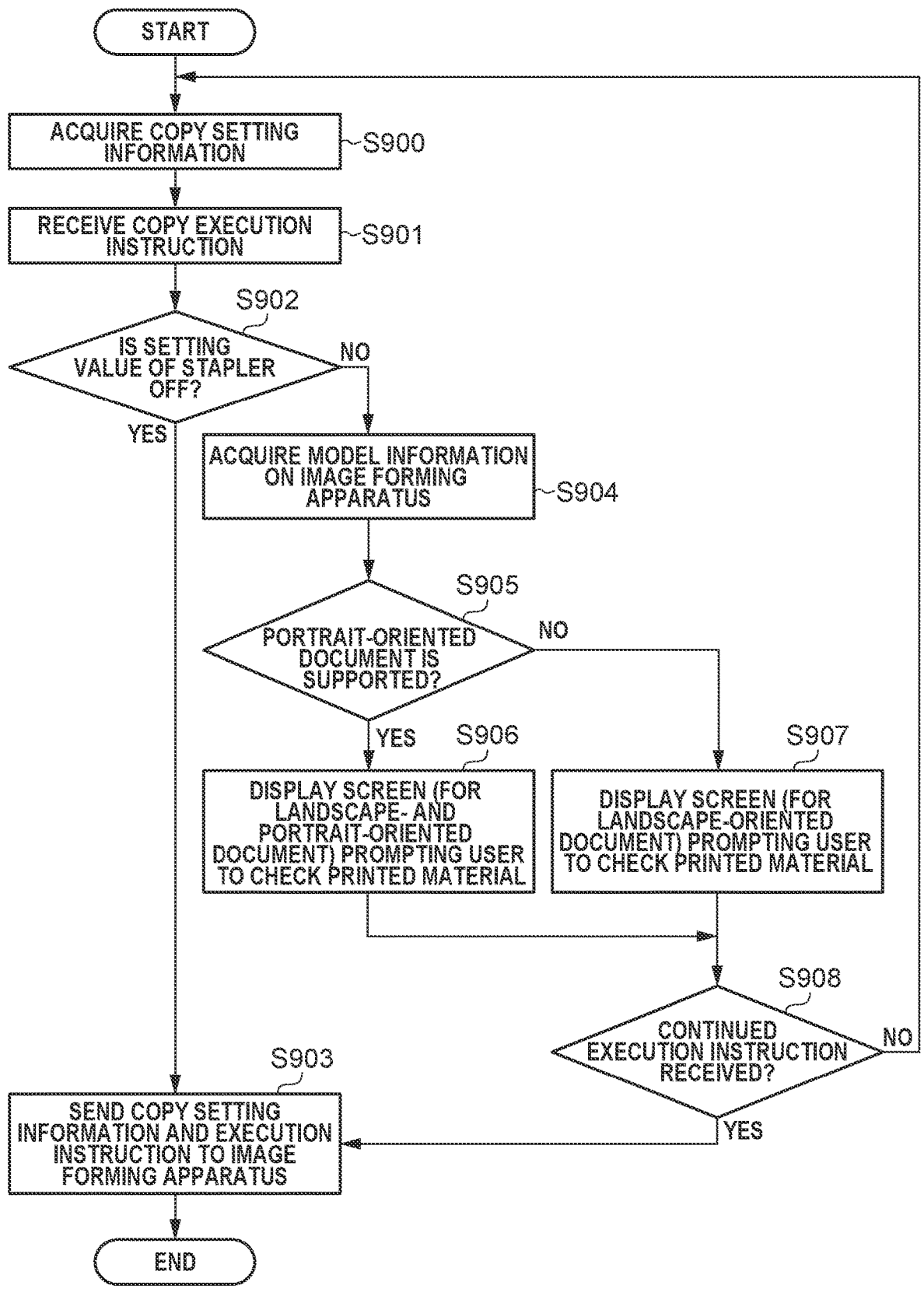
FIG. 9 is a flowchart illustrating an example of a processing procedure of the information processing apparatus according to a third exemplary embodiment.

FIG. 9 is a flowchart illustrating an example of a processing procedure for changing of the check screen to be displayed by using the model information on the image forming apparatus when copying is executed. The processing of the flowchart starts when the copy screen 600 in FIG. 6A is displayed on the display 214 by a user operation.

In steps S900 to S903, the UI control unit 402 and the job control unit 407 perform processing similar to the processing in steps S700 to S703 according to the first exemplary embodiment.

In step S904, the job control unit 407 acquires the model information on the image forming apparatus 104 from the image forming apparatus 104 via the network 103.

In step S905, the job control unit 407 uses the model information acquired in step S904 to determine whether the image forming apparatus 104 supports portrait-oriented documents. In a case where the job control unit 407 determines that the image forming apparatus 104 supports portrait-oriented documents (YES in step S905), the processing proceeds to step S906. On the other hand, in a case where the job control unit 407 determines that the image forming apparatus 104 does not support portrait-oriented documents (NO in step S905), the processing proceeds to step S907.

In step S906, the UI control unit 402 displays, on the display 214, a printed material check dialog applicable for both cases of portrait-oriented documents and landscape-oriented documents, in accordance with the stapler setting value. The screen that is displayed is, for example, the printed material check dialog (for stapler "upper left" setting) 620 when the stapler setting value is "upper left" and is the printed material check dialog (for stapler "lower left" setting) 630 when the stapler setting value is "lower left".

The above-described configuration causes the user to check the stapler position again in accordance with the model information on the image forming apparatus, and in a case where the output to be obtained is not as intended, the user can correct the document orientation and the stapler setting value.

In step S907, the UI control unit 402 displays, on the display 214, the printed material check dialog applicable only for a case of landscape-oriented documents, in accordance with the stapler setting value. The screen that is displayed is, for example, the printed material check dialog (for stapler "upper left" setting, with landscape-oriented documents) 640 when the stapler setting value is "upper left" and is the printed material check dialog (for stapler "lower left" setting, with landscape-oriented documents) 650 when the stapler setting value is "lower left".

In step S908, the UI control unit 402 performs processing similar to the processing in step S705 according to the first exemplary embodiment.

As described above, according to the present exemplary embodiment, detailed guidance can be provided by combining model information on the image forming apparatus, such as whether the image forming apparatus supports only landscape-oriented documents, and the setting, such as the stapler setting, that causes a difference in outputs in accordance with the functional differences among the image forming apparatuses, whereby the user operability can be further improved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-195537, filed Dec. 1, 2021, which is hereby incorporated by reference herein in its entirety.

What is claimed is:

1. An information processing apparatus comprising:
one or more processors configured to perform:
accepting setting information about a function of an image forming apparatus capable of communicating with the information processing apparatus;
obtaining device information about the image forming apparatus;
displaying information indicating an output content in a case where the image forming apparatus executes a function based on the setting information on a display unit; and
switching display on the display unit between a first screen including the information indicating the output content and a second screen different from the first screen and including the output content on the display unit, in a case where the setting information includes predetermined setting information with the output content that differs based on the device information about the image forming apparatus,
wherein the device information is information about a direction of a document in which the image forming apparatus is capable of executing the function, and
wherein a first screen including information indicating an output content when the document is placed in a vertical direction and information indicating an output content when the document is placed in a horizontal direction is displayed in a case where the device information includes information indicating that the document is placeable in the vertical direction, and a second screen not including the information indicating the output content when the document is placed in the vertical direction but including the information indicating the output content when the document is placed in the horizontal direction is displayed in a case where the device information includes information indicating that the document is not placeable in the vertical direction.

2. The information processing apparatus according to claim 1, wherein, in a case where the setting information is same as previous setting information transmitted to the image forming apparatus before, the information indicating the output content is not displayed on the display unit.

3. The information processing apparatus according to claim 2, wherein, in a case where the setting information is same as the previous setting information and a screen of the display unit has made no transition to the background after the function based on the previous setting information is executed, the information indicating the output content is not displayed on the display unit.

4. The information processing apparatus according to claim 1, wherein the first screen or the second screen is displayed on the display unit before an execution instruction to execute the function based on the setting information is sent to the image forming apparatus.

5. The information processing apparatus according to claim 1, wherein the predetermined setting information is setting information indicating a position where a document on which the function is executed is stapled.

6. The information processing apparatus according to claim 1, wherein the function is a copy function.

7. The information processing apparatus according to claim 1, wherein the first screen and the second screen include information about the predetermined setting information.

8. The information processing apparatus according to claim 1, wherein the first screen and the second screen include information to prompt a user to confirm the predetermined setting information based on the information indicating the output content.

9. The information processing apparatus according to claim 1, wherein information to cause the image forming apparatus to execute the function based on the setting information is sent to the image forming apparatus.

10. The information processing apparatus according to claim 9, wherein first communication with the image forming apparatus is established and the setting information is sent to the image forming apparatus.

11. The information processing apparatus according to claim 10, wherein the first communication is wireless local area network (wireless LAN) communication.

12. The information processing apparatus according to claim 10, wherein Near Field Communication is established with the image forming apparatus is established, connection information for establishing the first communication is acquired, and the first communication is established based on the connection information.

13. A control method for an information processing apparatus that sends a job to an image forming apparatus to execute a function of the image forming apparatus, the control method comprising:
accepting setting information about a function of an image forming apparatus capable of communicating with the information processing apparatus;
obtaining device information about the image forming apparatus;
displaying information indicating an output content in a case where the image forming apparatus executes a function based on the setting information on a display unit; and
switching display on the display unit between a first screen including the information indicating the output content and a second screen different from the first screen and including the output content on the display unit, in a case where the setting information includes predetermined setting information with the output content that differs based on the device information about the image forming apparatus,
wherein the device information is information about a direction of a document in which the image forming apparatus is capable of executing the function, and
wherein a first screen including information indicating an output content when the document is placed in a vertical direction and information indicating an output content when the document is placed in a horizontal direction is displayed in a case where the device information includes information indicating that the document is placeable in the vertical direction, and a second screen not including the information indicating the output content when the document is placed in the vertical direction but including the information indicating the output content when the document is placed in the horizontal direction is displayed in a case where the device information includes information indicating that the document is not placeable in the vertical direction.

14. A non-transitory computer-readable storage medium storing one or more programs including instructions, which when executed by one or more processors of an information processing apparatus configured to send a job to an image forming apparatus to execute a function of the image forming apparatus, cause the information processing apparatus to perform operations comprising:
　　accepting setting information about a function of an image forming apparatus capable of communicating with the information processing apparatus;
　　obtaining device information about the image forming apparatus;
　　displaying information indicating an output content in a case where the image forming apparatus executes a function based on the setting information on a display unit; and
　　switching display on the display unit between a first screen including the information indicating the output content and a second screen different from the first screen and including the output content on the display unit, in a case where the setting information includes predetermined setting information with the output content that differs based on the device information about the image forming apparatus,
wherein the device information is information about a direction of a document in which the image forming apparatus is capable of executing the function, and
wherein a first screen including information indicating an output content when the document is placed in a vertical direction and information indicating an output content when the document is placed in a horizontal direction is displayed in a case where the device information includes information indicating that the document is placeable in the vertical direction, and a second screen not including the information indicating the output content when the document is placed in the vertical direction but including the information indicating the output content when the document is placed in the horizontal direction is displayed in a case where the device information includes information indicating that the document is not placeable in the vertical direction.

\* \* \* \* \*